United States Patent
Zhang

(10) Patent No.: US 8,276,281 B2
(45) Date of Patent: Oct. 2, 2012

(54) CIRCULAR SAW

(75) Inventor: Shisong Zhang, Suzhou (CN)

(73) Assignee: Positec Power Tools (Suzhou) Co., Ltd., Jiangsu (CN)

( * ) Notice: Subject to any disclaimer, the term of this patent is extended or adjusted under 35 U.S.C. 154(b) by 1190 days.

(21) Appl. No.: 11/536,515

(22) Filed: Sep. 28, 2006

(65) Prior Publication Data
US 2007/0074404 A1    Apr. 5, 2007

(30) Foreign Application Priority Data

Sep. 30, 2005 (CN) .......................... 2005 1 0094730
Sep. 30, 2005 (CN) .......................... 2005 1 0094731
May 30, 2006 (CN) .......................... 2006 1 0084983

(51) Int. Cl.
*B27B 9/02* (2006.01)
(52) U.S. Cl. .......................... 30/376; 30/388
(58) Field of Classification Search .................. 30/166.3, 30/274–377, 388–391
See application file for complete search history.

(56) References Cited

U.S. PATENT DOCUMENTS

| | | | | | |
|---|---|---|---|---|---|
| 1,830,580 | A | * | 11/1931 | Wappat ............................ | 30/376 |
| 1,932,511 | A | * | 10/1933 | Clarke ........................... | 83/486.1 |
| 3,292,673 | A | * | 12/1966 | Gregory .......................... | 30/377 |
| 3,504,716 | A | * | 4/1970 | Morganson et al. ............. | 30/123 |
| 4,078,309 | A | * | 3/1978 | Wilson ............................ | 30/375 |
| 4,453,312 | A | * | 6/1984 | Nishioka ......................... | 30/372 |
| 4,483,071 | A | * | 11/1984 | te Kolste ......................... | 30/376 |
| 4,589,208 | A | * | 5/1986 | Iwasaki et al. .................. | 30/376 |
| 4,730,396 | A | * | 3/1988 | Nishioka ......................... | 30/371 |
| 4,870,758 | A | | 10/1989 | Fushiya | |
| 4,999,916 | A | * | 3/1991 | Sistare ............................. | 30/376 |
| 5,010,651 | A | * | 4/1991 | Techter et al. .................. | 303/76 |
| 5,271,155 | A | * | 12/1993 | Fuchs et al. ..................... | 30/376 |
| 5,414,935 | A | * | 5/1995 | Braunbach et al. ............. | 30/376 |
| 5,433,008 | A | * | 7/1995 | Barger et al. ................... | 30/376 |
| 5,461,790 | A | * | 10/1995 | Olstowski ....................... | 30/391 |
| 5,517,763 | A | * | 5/1996 | Schilling et al. ............... | 30/376 |
| 5,561,907 | A | * | 10/1996 | Campbell et al. ............... | 30/371 |
| 5,924,207 | A | * | 7/1999 | Price et al. ...................... | 30/376 |
| 6,484,410 | B1 | * | 11/2002 | Meastas .......................... | 30/373 |
| 6,601,305 | B1 | * | 8/2003 | Fukuoka ......................... | 30/376 |
| 6,688,004 | B2 | * | 2/2004 | Havenstein et al. ............ | 30/374 |
| 6,735,875 | B1 | * | 5/2004 | Eslambolchi et al. .......... | 30/377 |
| 7,103,979 | B2 | * | 9/2006 | Yoshida et al. ................. | 30/376 |
| 2003/0000091 | A1 | | 1/2003 | Havenstein et al. | |
| 2003/0131484 | A1 | * | 7/2003 | Yoshida et al. ................. | 30/376 |
| 2005/0160608 | A1 | * | 7/2005 | Tanimoto et al. ............... | 30/391 |
| 2006/0179666 | A1 | * | 8/2006 | Mok et al. ...................... | 30/388 |

FOREIGN PATENT DOCUMENTS

CN         1745946         3/2006
(Continued)

Primary Examiner — Jason Daniel Prone

(57) ABSTRACT

A circular saw includes a housing, an electrical motor mounted in the housing, a base plate disposed below the housing, a saw blade attached to the housing and driven by the electrical motor, and an alignment indication assembly coupled to the housing. The saw blade has a portion below the base plate and can be tilted with respect to the base plate in a transverse direction. The alignment indication assembly has an indication member with an indicating end. The indication member is movable relative to a rotation center of the saw blade when the saw blade is being tilted with respect to the base plate so that the indicating end is maintained in front of and in line with the saw blade all the time.

30 Claims, 19 Drawing Sheets

FOREIGN PATENT DOCUMENTS

| | | | |
|---|---|---|---|
| DE | 3429095 C2 * | 1/1987 | |
| DE | 3922849 | 1/1991 | |
| GB | 2182280 A * | 5/1987 | |
| GB | 2323810 | 10/1998 | |
| WO | 2004011212 | 2/2004 | |
| WO | WO 2004/011212 | 2/2004 | |

* cited by examiner

CIRCULAR SAW

FIELD OF THE INVENTION

The present invention relates generally to a circular saw, and more particular to a circular saw having an alignment indication assembly.

THE RELATED ARTS

A circular saw generally includes a housing, an electrical motor mounted in the housing, a base plate disposed below the housing, and a saw blade having a lower half projecting below the base plate. To operate, the base plate is placed on a workpiece with the saw blade driven by the motor to cut the workpiece. In some circumstances, an operator needs to tilt the saw blade with respect to the base plate for inclined cutting of the workpiece. For purpose of precise inclined cutting, the workpiece is generally provided with a guide line marked on a surface thereof to indicate the cutting route of the saw blade, and the circular saw has an alignment indication in front of and in line with the saw blade to provide a visual reference for the operator.

U.S. Pat. No. 4,870,758 discloses indication means for a circular saw. The indication means defines a pair of notches in the front end of the base plate. To cut the workpiece, the operator can conduct a proper cut according to the alignment of the corresponding notch with the guide line of the workpiece. However, such indication means merely provides the alignment in two predetermined cases, such as one case that the saw blade is held upright, and the other case that the saw blade is tilted at a predetermined angle with respect to the base plate. Further, International Application WO 2004/011212 discloses a circular saw with another alignment indication means. The circular saw has a housing and a laser emitter is provided on the housing. In performing a cutting operation, the laser emitter emits a laser beam which is in front of and in line with the saw blade at all times. By this means, the circular saw can always do a proper cut no matter what angle the saw blade is tilted with respect to the base plate.

SUMMARY OF THE INVENTION

An object of the present invention is to provide a circular saw having an alignment indication assembly for indication alignment of a saw blade with respect to a cutting route at all circumstances.

To achieve the object, the present invention provides a circular saw including a housing, an electrical motor mounted in the housing, a base plate disposed below the housing, a saw blade attached to the housing and driven by the electrical motor, and an alignment indication assembly coupled to the housing. The saw blade has a portion below the base plate and can be tilted with respect to the base plate in a transverse direction. The alignment indication assembly has an indication member with an indicating end. The indication member is movable relative to a rotation center of the saw blade when the saw blade is being tilted with respect to the base plate so that the indicating end is maintained in front of and in line with the saw blade all the time.

BRIEF DESCRIPTION OF THE DRAWINGS

The invention will now be described in a non-limitative sense with reference to the accompanying drawings, in which.

DETAILED DESCRIPTION OF THE PREFERRED EMBODIMENTS

Figure 1:
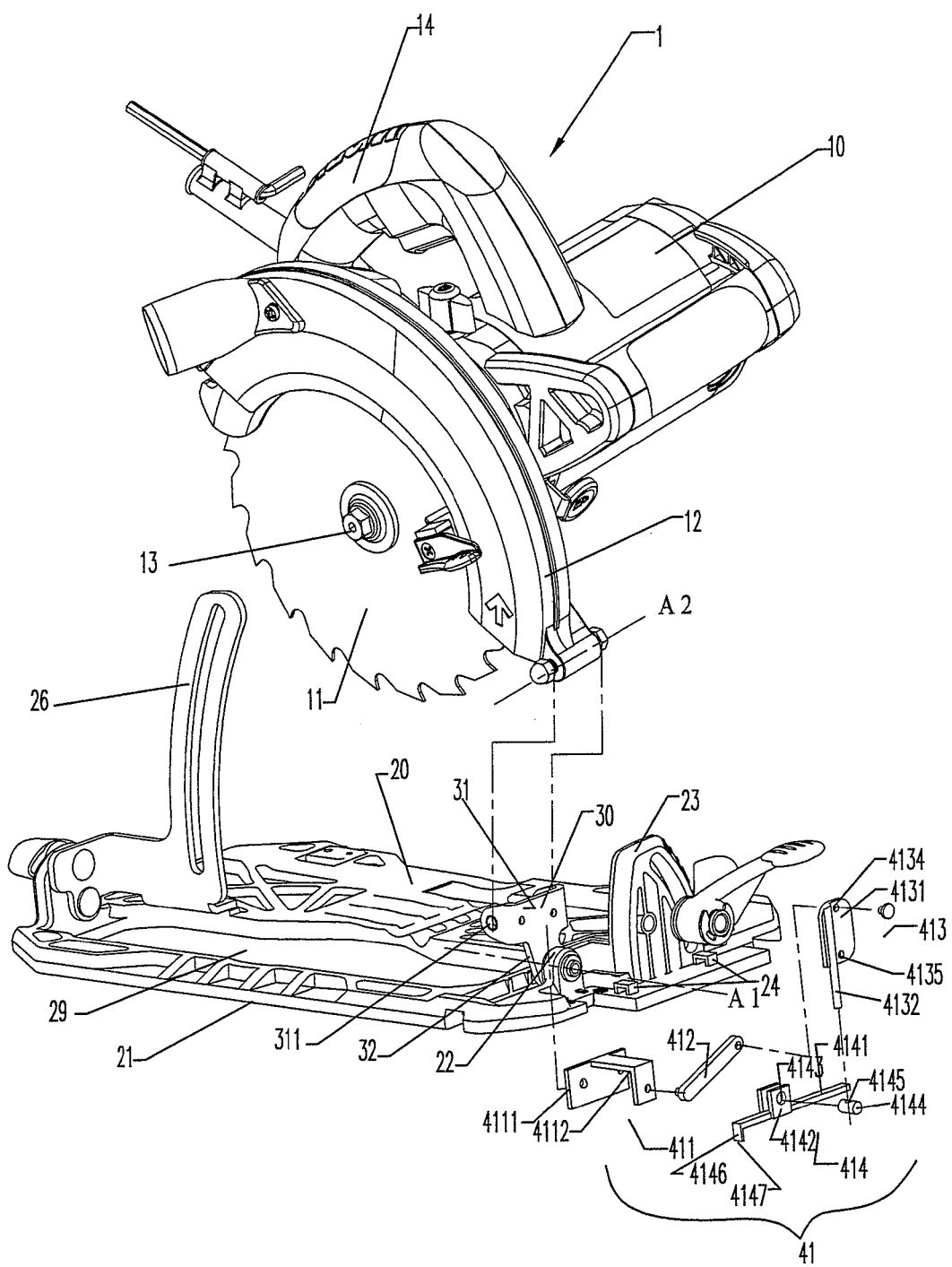
FIG. 1 is an exploded, perspective view of a circular saw constructed in accordance with a first embodiment of the present invention.
Figure 2A:
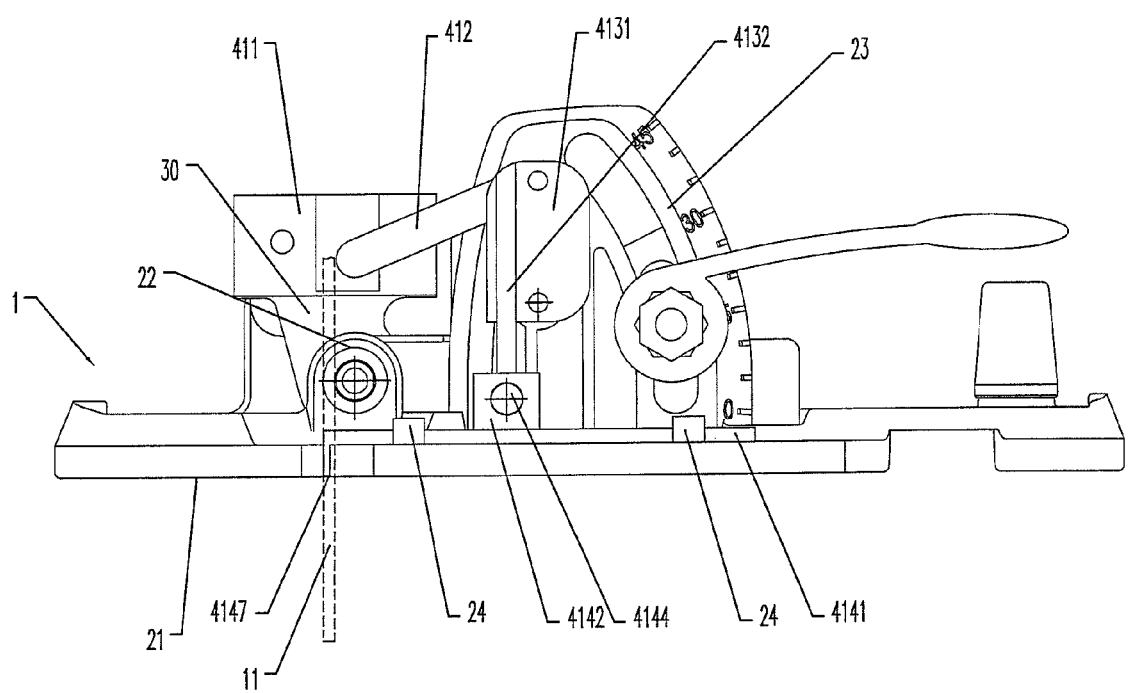
FIG. 2A is a side elevational view of the circular saw in accordance with the first embodiment of the present invention, wherein the saw blade is held upright with respect to the base plate.
Figure 2B:
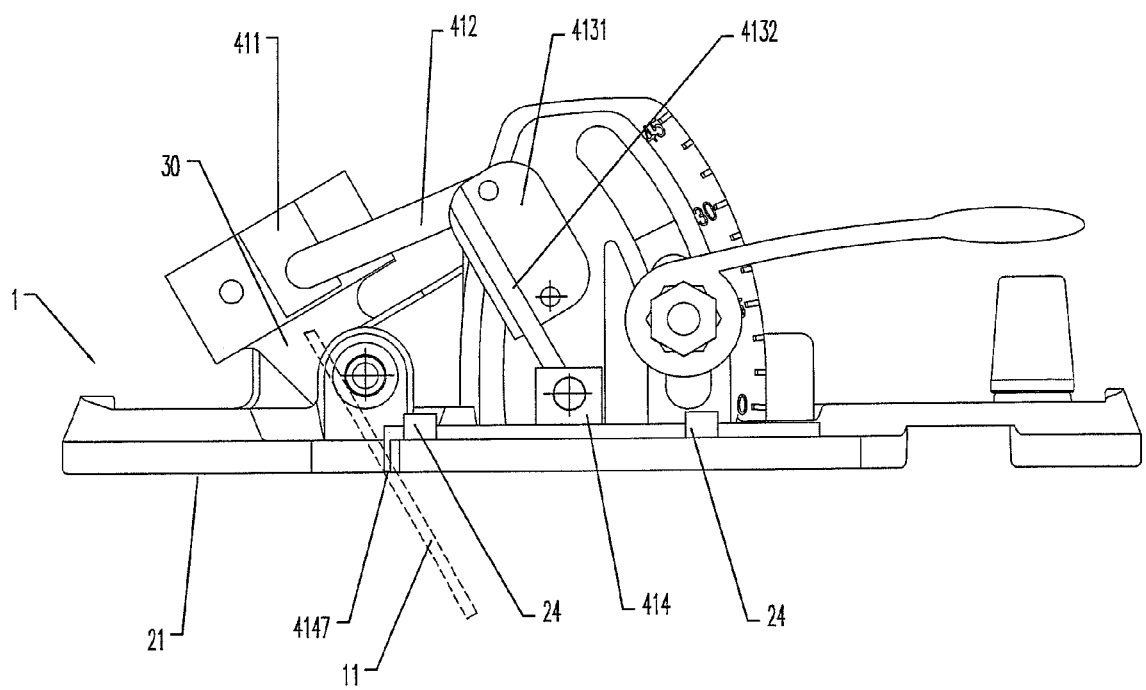
FIG. 2B is a side elevational view of the circular saw in accordance with the first embodiment of the present invention, wherein the saw blade is tilted transversely with respect to the base plate.

With reference to the drawings and in particular to FIGS. 1, 2A, and 2B, which show a circular saw, generally designated with reference numeral 1, constructed in accordance with a first embodiment of the present invention, the circular saw 1 comprises a housing 10, an electrical motor (not fully shown) mounted in the housing 10 and having a spindle 13 extending in a transverse direction, a saw blade 11 partially covered by the housing 10 and having a rotation center secured to the spindle 13 to be driven by the motor in operation, a base plate 20 mounted below the housing 10, and an alignment indication assembly 41 for indicating alignment of the saw blade 11 with respect to a guide line provided on a cutting surface of a workpiece (not shown). The housing 10 comprises a cover 12 substantially covering an upper portion of the saw blade 11 for security purposes, and a handle 14 for manual operation by an operator.

Figure 11:
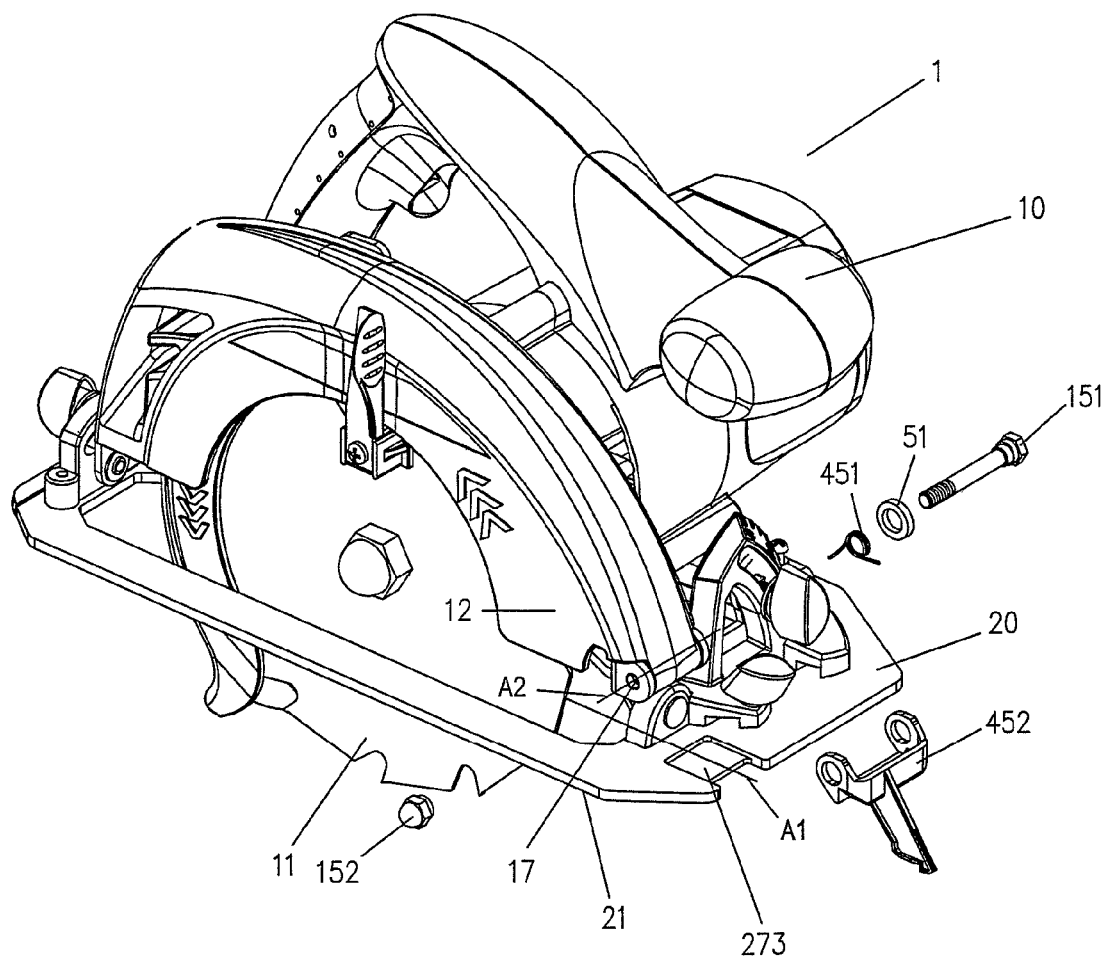
FIG. 11 is a perspective view of a circular saw constructed in accordance with a fifth embodiment of the present invention, wherein an alignment indication assembly is exploded for clear illustration.

The base plate 20 is a generally rectangular flat plate. The base plate 20 defines a longitudinally extending opening 29 through which a lower half of the saw blade 11 extends. The opening 29 has a sufficient width, which is a dimension of the opening 29 measured in the transverse direction, to allow the saw blade 11 to tilt transversely with respect to the base plate 20. The base plate 20 forms a first bracket 22, a second bracket 26, and a third bracket 23, all extending upward therefrom. The first bracket 22 and the third bracket 23 are positioned adjacent to a front end of the base plate 20, while the second bracket 26 is close to a rear end of the base plate 20. An intermediate panel 30 is connected between the housing 10 and the base plate 20. The intermediate panel 30 has an upper portion 31 and a lower portion 32. The lower portion 32 is pivotally connected to the first bracket 22 and defines a first axis A1 around which the saw blade 11, together with the housing 10 and the motor secured in the housing 10, is selectively rotated and thus tilting transversely with respect to the base plate 20. It is noted that "tilting transversely with respect to the base plate" as used herein indicates that an imaginary intersection line of a first imaginary plane coincident with the saw blade 11 and a second imaginary plane coincident with the base plate 20 changes position in the transverse direction as the saw blade is tilted. The upper portion 31 of the intermediate panel 30 has a pair of rearward extending arms (not labeled) defining aligned holes 311 through which a pivot structure defining a second axis A2 of the housing 10 rotatably extends. The pivot structure, which has the same configuration as the counterpart set forth in a fifth embodiment shown in FIG. 11, will be further described hereinafter. This second axis A2 defined by the pivot structure provides a rotational axis around which the saw blade 11, together with the housing 10 and the motor secured in the housing 10, is rotatable to adjust the extent of projection of the saw blade 11 below the base plate 20.

The alignment indication assembly 41 comprises an urging mechanism and an indication member. In the embodiment illustrated, the urging mechanism comprises a first lever 411 attached to the intermediate panel 30, a second lever 412 pivotally connected to the first lever 411, and a third lever 413 pivotally connected to the second lever 412. The first lever 411 has an upstanding panel 4111 fixed to the intermediate panel 30 by any know means, such as bolts or rivets, and a bar 4112 extending horizontally from the upstanding panel 4111 and forming a right-angled free end portion extending downwardly therefrom. The second lever 412 has one end pivotally connected to the bar 4112, particularly to the right-angled end portion thereof, and an opposite end pivotally connected to the third lever 413. The third lever 413 has a pole 4132 and a plate 4131 formed on an upper portion of the pole 4132. The plate 4131 defines upper and lower holes 4134, 4135 arranged vertically and pivotally connected to the second lever 412 and the third bracket 23, respectively. The engagements between the second lever 412 and the first lever 411, the third lever 413 and the second lever 412, the third bracket 23 and the third lever 413 can be any known connection means, such as a pivot stud rotatably received in a mating hole.

In embodiment illustrated, the indication member 414 comprises a transversely extending bar 4141, a pair of spacers 4142 formed at opposite longitudinal edges of the bar 4141 and defining aligned holes 4143, and a peg 4144 extending through the holes 4143 and defining in a middle thereof an upright bore 414 extending substantially in a radial direction with respect to a center axis of the peg 4144. The pole 4132 of the third lever 413 extends through and is partially received in the bore 4145 for selectively moving the indication member 414 with respect to the base plate 20. The base plate 20 comprises a pair of guiding members 24 at locations close to the front end thereof. The guiding members 24 align with each other in the transverse direction, serving as restriction members that allow only movement of the indication member 414 in the transverse direction, and fix the indication member 414 in other directions.

The indication member 414 has a tab 4146 extending vertically downwardly and forming a distal end of the bar 4141. The tab 4146 has a bottom end 4147 which is preset in line with the saw blade 11 as indicated by phantom lines shown in FIG. 2A for purpose of providing a visual indication of the alignment of saw blade 11 and a guide line on the cutting surface of the workpiece.

To operate the circular saw for cutting a workpiece, a bottom surface 21 of the base plate 20 is positioned on the cutting surface of the workpiece. The indication member 414, with the horizontal bar 4141 thereof slidably positioned on the base plate 20, positions the indicating end 4147, namely the bottom end of the tab 4146 of horizontal bar 4141, substantially in flush with the bottom surface 21 of the base plate 20 for more precise indication. It is noted that the term "substantially" used herein does not means the indicating end 4147 is exactly in physical engagement and thus flush with the bottom surface 21, (in other words, the indicating end 4147 contacting the cutting surface of the workpiece, and it is preferred that the indicating end 4147 is spaced from the bottom surface 21 of the base plate 20 by a very tiny gap so as to ensure no sliding friction is created therebetween during the movement of the indicating end 4147 with respect to the workpiece and thus, the indication member is fluently movable, causing no adverse effect on cutting performance of the saw blade. In other embodiments, the base plate 20 comprises a number of standoffs extending from the bottom surface 21 thereof, and in such a case, the indicating end 4147 is further extended beyond the bottom surface 21 of the base plate 20 to be substantially in flush with a work surface of the base plate 20 that contact the workpiece. In present invention, the tiny gap or distance between the indicating end 4147 of the indication member 414 and the bottom surface 21 of the base plate 20 is preferably not larger than 2 mm.

With reference to FIG. 2B, when the saw blade 11 (show in phantom lines) is being tilted transversely with respect to the base plate 20, the housing 10, together with the saw blade 11 and the intermediate panel 30, is rotated around the first axis A1 by the operator operating the handle 14. The first lever 411, the second lever 412, the third lever 413, and the indication member 414 are of such sizes and spatial relationship that they form a linkage which ensures the first lever 411 and the third lever 413 to move in the same angular velocity. Since the first lever 411 is fixed to the intermediate panel 30, which means the first lever 411 is immovable relative to the housing 10 and the rotation center of the saw blade 11 during the saw blade rotates for tilting, the angular velocity of the third lever 413 equals to that of the saw blade 11 so that when the saw blade 11 is rotated for tilting, the linkage formed by the first, second, and third levers 411, 412, 413 and the indication member 414 moves the horizontal bar 4141 and thus the indicating end 41417 in the transverse direction. Further, the indication member 414 is only allowed to move in the transverse direction due to the constraints of the guiding members 24, and the indicating end 4147 initially aligns the saw blade 11 at the intersection line of the saw blade and the base plate 20, and consequently, the indicating end 4147 is always maintained in line with the saw blade 11 no matter what angle the saw blade is tilted with respect to the base plate 20. In other words, the indicating end 4147 of the indication member 414 and the saw blade 11 are always on the same plane, which means the indicating end 4147 takes relative movement with respect to the saw blade 11 on the plane coincident with the saw blade 11.

By this arrangement, the operator can perform a precise cut at all times by simply aligning the indicating end 4147 with the guide line provided on the workpiece. It is apparent that the indicating end 4147 can be formed at any location on the indication member 414 other than the bottom end, provided that a space existing between the indicating end and the workpiece is not larger than 2 mm. In addition, the first lever 411 can be directly fixed to the housing 10 without using an intermediate panel.

Figure 3A:
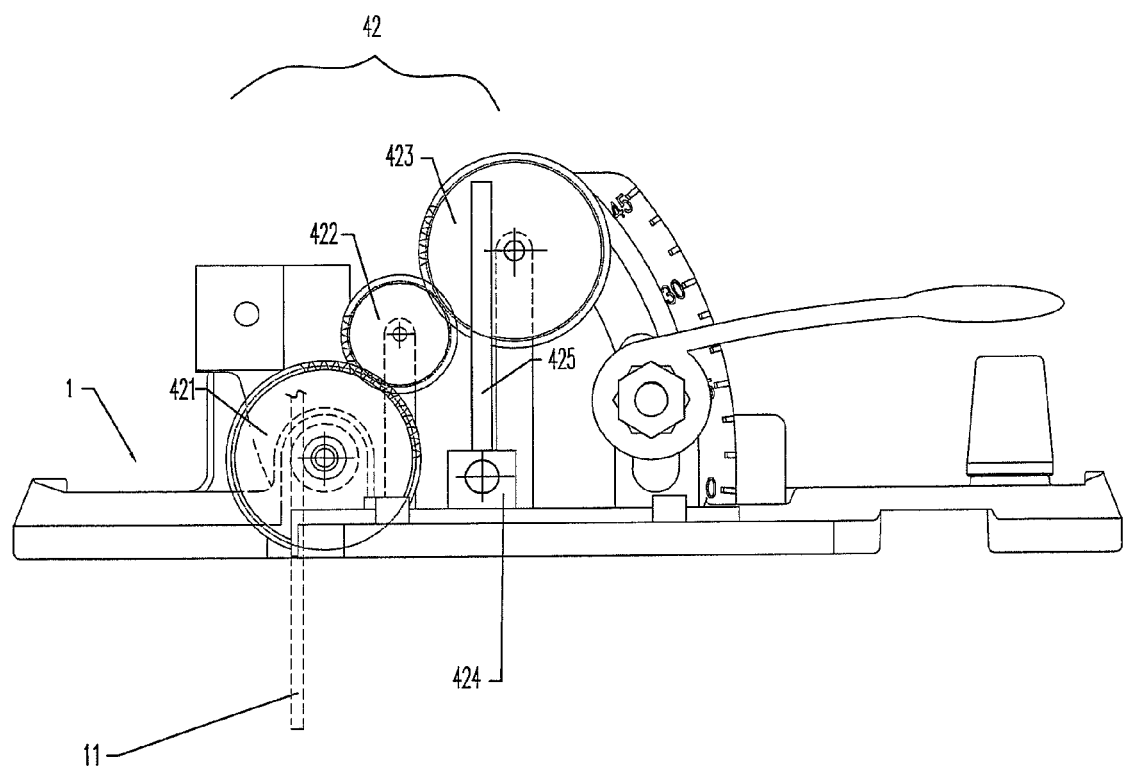
FIG. 3A is a side elevational view of the circular saw constructed in accordance with a second embodiment of the present invention, wherein the saw blade is held upright with respect to the base plate.
Figure 3B:
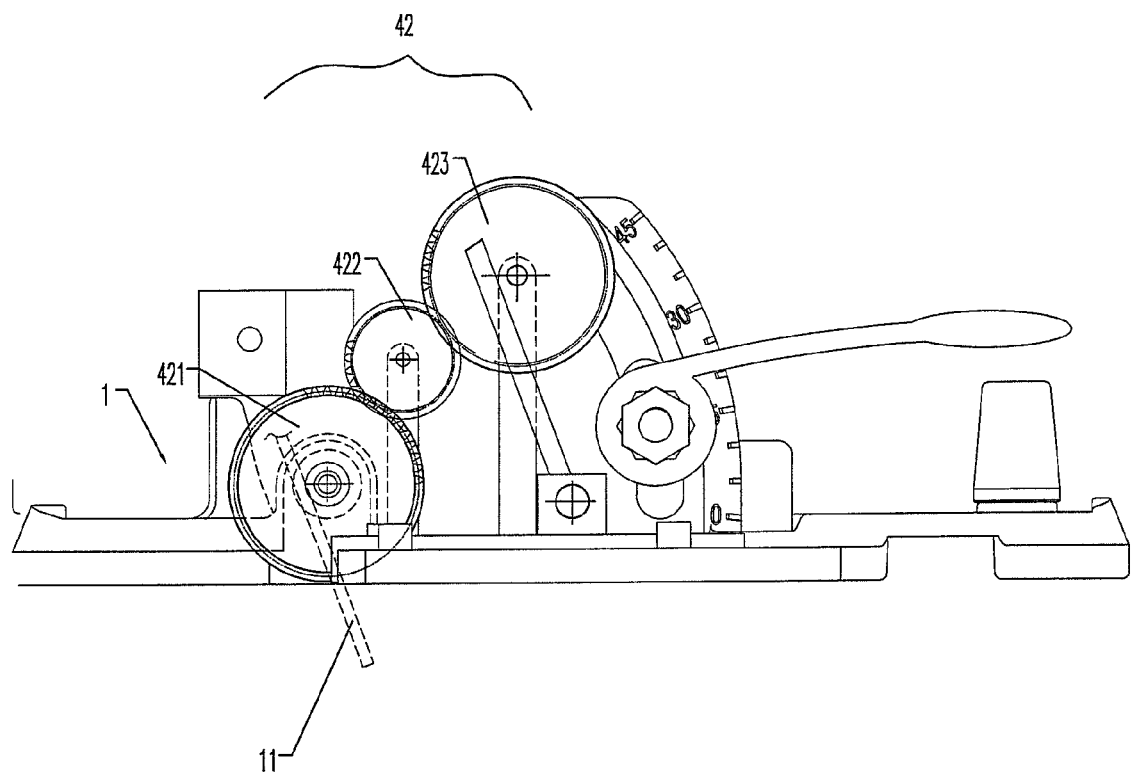
FIG. 3B is a side elevational view of the circular saw in accordance with the second embodiment of the present invention, wherein the saw blade is tilted transversely with respect to the base plate.
Figure 4:
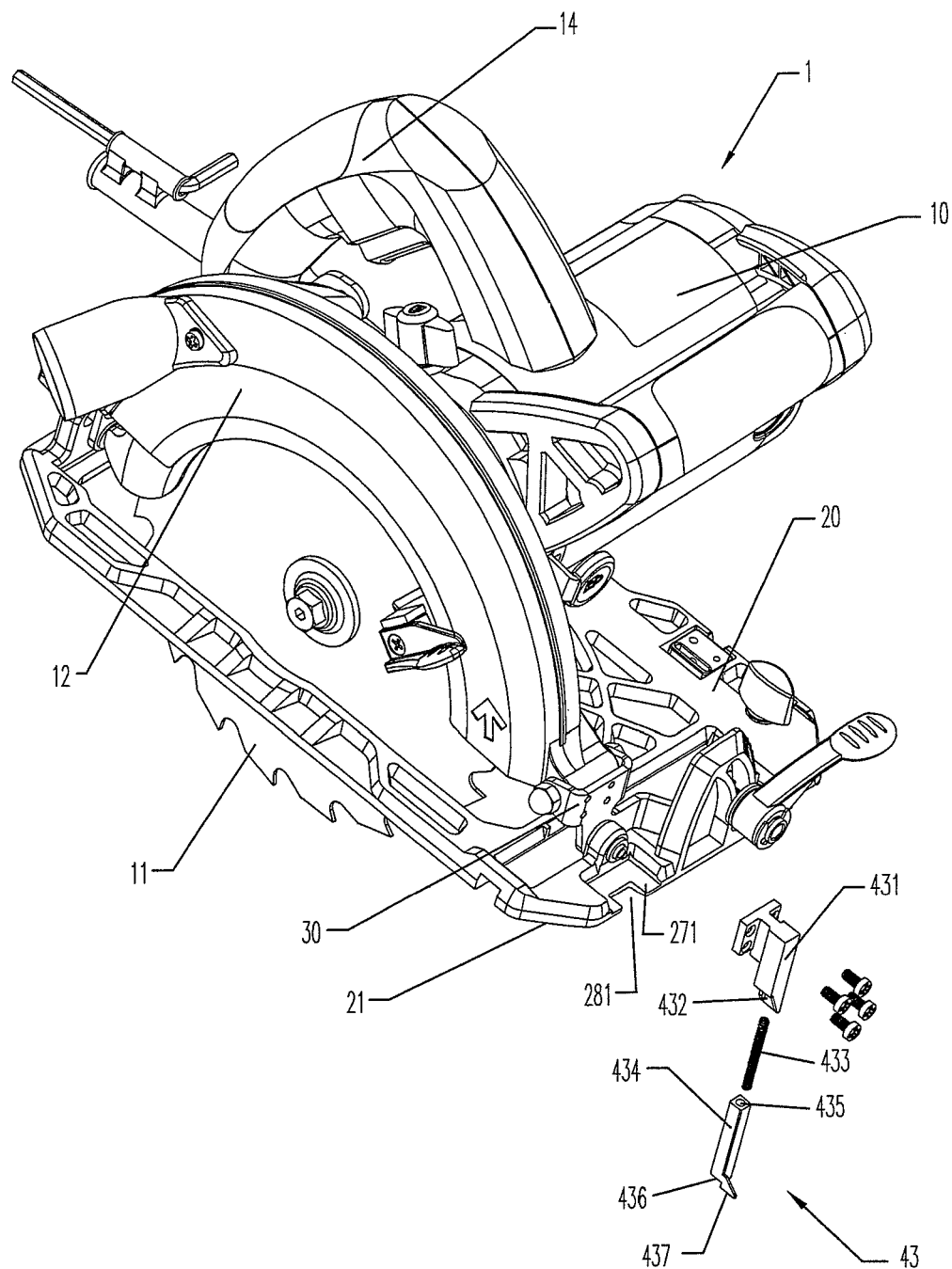
FIG. 4 is a perspective view of a circular saw constructed in accordance with a third embodiment of the present invention, wherein an alignment indication assembly is exploded for clear illustration.

FIGS. 3A and 3B show a circular saw in accordance with a second embodiment of the present invention. The configuration of the circular saw of the second embodiment is generally identical to that of the first embodiment, except the alignment indication assembly. In the second embodiment, the alignment indication assembly, which is designated with reference numeral 42 for distinction, similarly comprises an urging mechanism and an indication member. The urging mechanism consists of a gear assembly including a first gear 421 centered at the first axis and connected to the intermediate panel (not shown) and rotatable in unison with the intermediate panel and the saw blade 11 about the first axis when the saw blade 11 is being tilted, a second gear 422 meshing with the first gear 421, a third gear 423 meshing with the second gear 422, and a rod 425 secured to the third gear 423 in an eccentric manner with respect to the third gear 423. The rod 425 is connected to the indication member 424 in the similar way as described previously with reference to the first embodiment for moving an indication member 424, which is a counterpart of the indication member 414 of the first embodiment and has the same construction and operation. Thus, further description of the indication member 424, unless related to the illustration of the operation of the second embodiment, will not be repeated. The fixed connections between the first gear 421 and the intermediate panel, and between the third gear 423 and the rod 425 can be achieved by means of for example welding or other known means, such as bolting or riveting. The second and the third gears 422, 423 each have a rotation center secured to the base plate by means of pivotally connecting the rotation center to a post standing on the base plate. In the second embodiment, the first gear 421 and the third gear 423 have the same number of teeth and substantially the same radius. By this arrangement, the first gear 421 and third gear 423 have the same rotational speed when the saw blade 11 is tilted transversely with respect to the base plate, and consequently, the rod 425 is ensured the same angular velocity as the saw blade 11 in doing tilting. Accordingly, the indicating end of the indication member is maintained in line with the saw blade all the time.

FIGS. 4-8 illustrate a circular saw in accordance with a third embodiment of present invention. In comparison with the first and second embodiments discussed previously, the circular saw has an alignment indication assembly with a relatively simple structure. The circular saw similarly comprises a housing 10, an electrical motor, a handle 14, a saw blade 11, a cover 12, an intermediate panel 30 all having the same configurations as their counterparts described in the previous embodiments, and a base plate 20 structured similarly to that of the previous embodiments. In the third embodiment, the base plate 20 has a recessed support panel 271 formed at the front end thereof. The support panel 271 defines a cutout 281 at a front end thereof. The circular saw of the third embodiment has an alignment indication assembly, which is designated with reference numeral 43 for distinction, similarly comprising an urging mechanism and an indication member. The urging mechanism comprises a fixed member 431 fixed to the intermediate panel 30 by fasteners, such bolts, and defining a first, downwardly extending groove 432 therein and an elastic member 433, such as a helical spring shown in the drawings. The alignment indication assembly 43 has an indication member 434 generally in form of an elongated rod defining a second, upward extending groove 435 and a tab generally extending downward in an oblique direction. The tab has a bottom end 437 functioning as the indicating end 4147 of the first embodiment for aligning with a guide line or mark line provided on a workpiece, and an edge 436 positioned above the indicating end 437.

Figure 5:
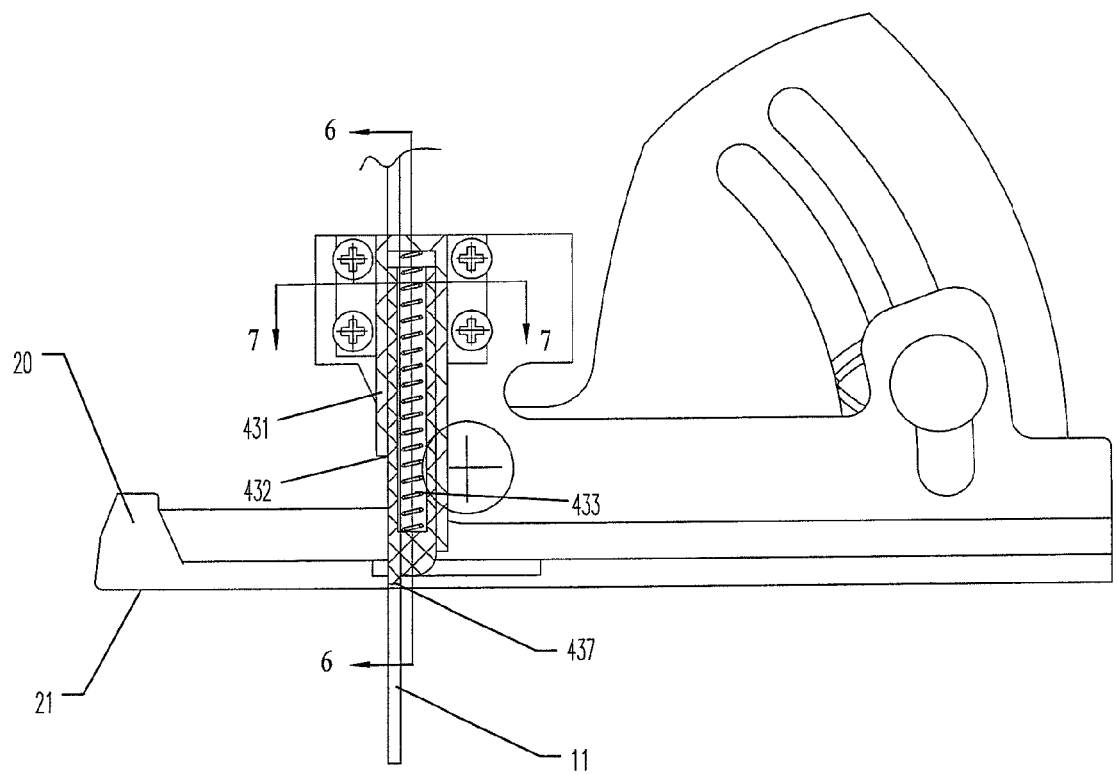
FIG. 5 is a cross-sectional view of the circular saw in accordance with the third embodiment of the present invention.
Figure 6:
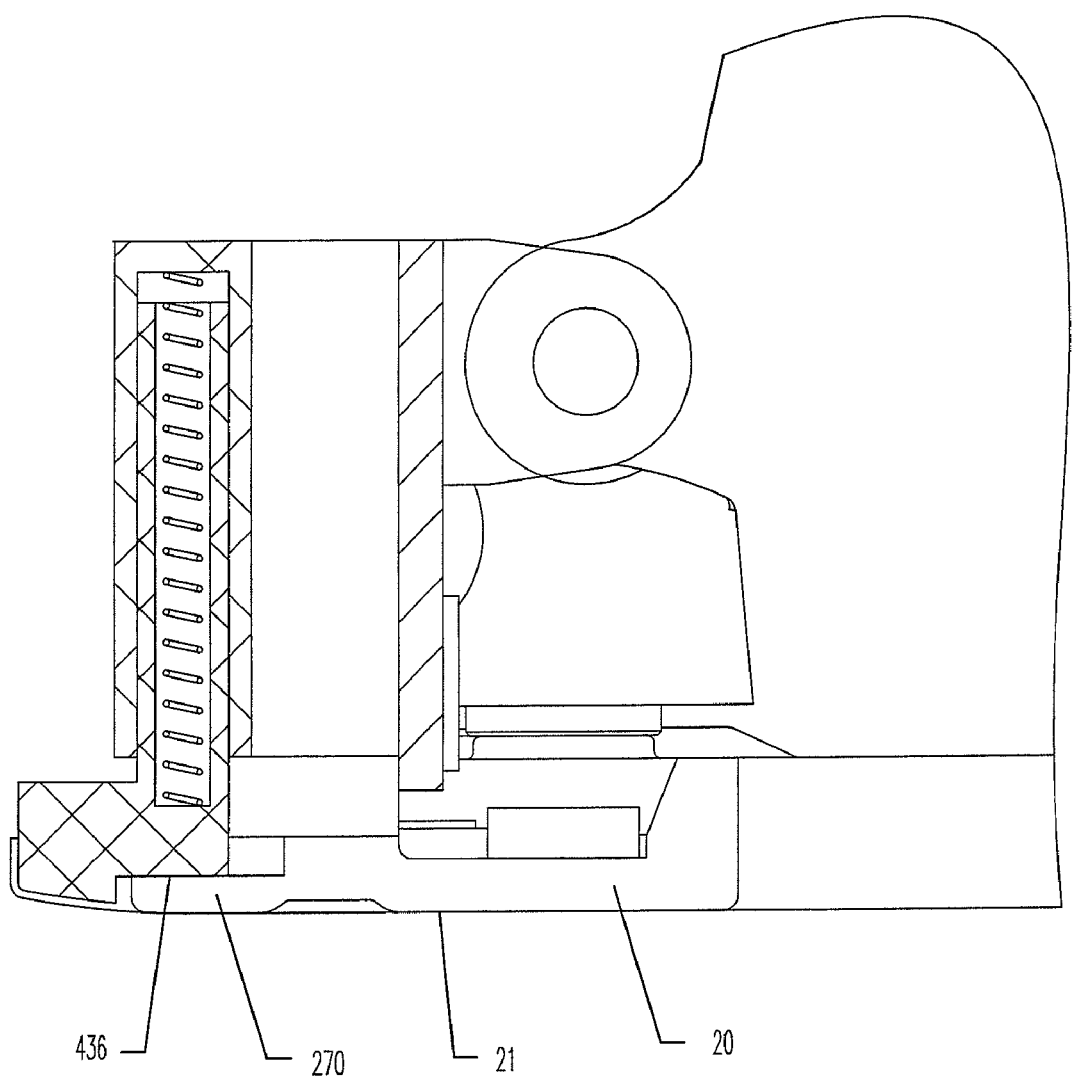
FIG. 6 is a cross-sectional view taken along line 6-6 of FIG. 5.
Figure 7:
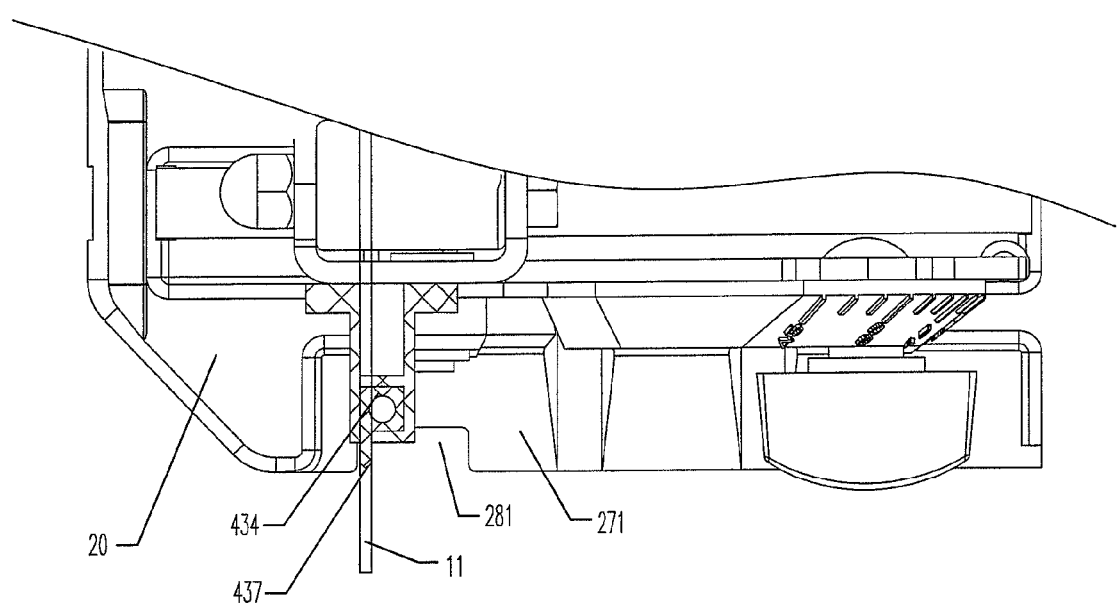
FIG. 7 is a cross-sectional view taken along line 7-7 of FIG. 5.

With reference to FIGS. 5-7, the indication member 434 is fit into the first groove 432 of the fixed member 431 with the opening of the second groove 435 located inside the first groove 432. The spring 433 is received, in compressed manner, in the second groove 435 of the indication member 434 with an end projecting outside the second groove 435 so that the spring 433 is compressed and thus inducing a biasing force between the fixed member 431 and the indication member 434. The edge 436 of the tab abuts against the support panel 271 to prevent the indication member 434 from being separated from the fixed member 431 by the biasing force of the spring 433. The bottom end 437 of the tab is positioned in the cutout 281 and substantially in flush with the bottom surface 21 of the base plate 20 and further in line with the saw blade 11 at an initial upright position of the saw blade 11.

Figure 8:
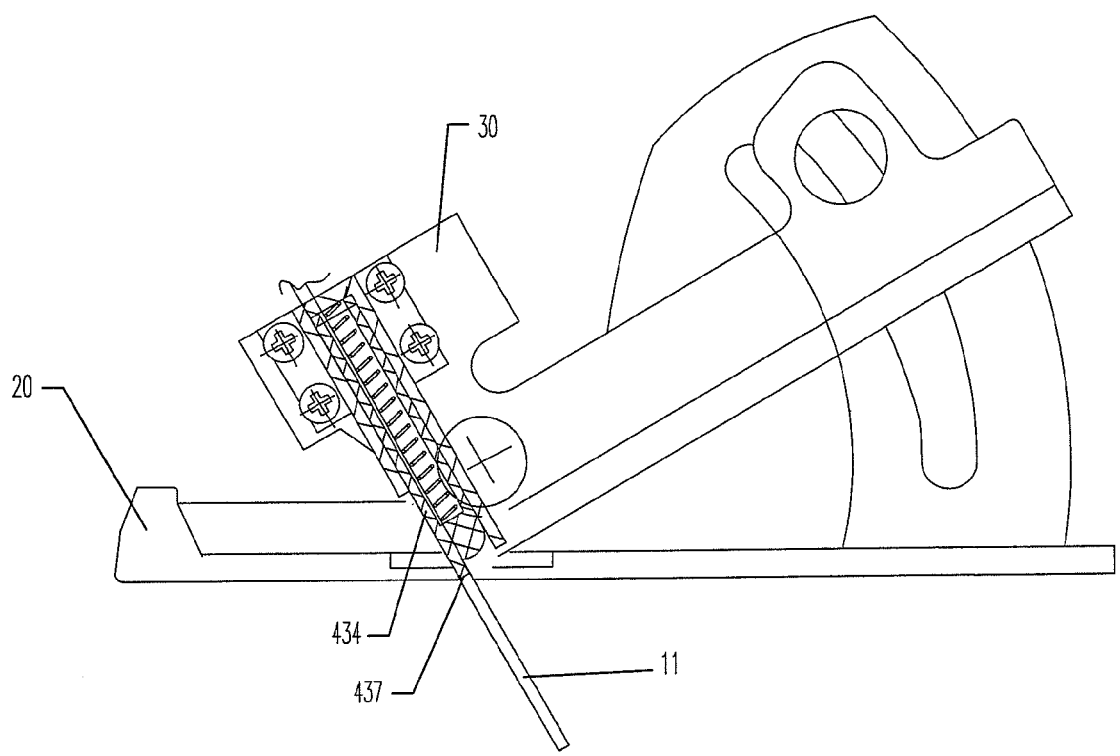
FIG. 8 is a cross-sectional view similar to FIG. 5 but showing the saw blade tilted transversely with respect to the base plate.

As shown in FIG. 8, when the saw blade 11 is rotated about the first axis for tilting, the alignment indication assembly 43 rotates in unison with the saw blade 11 due to the interconnection with the intermediate panel 30. While the saw blade 11 is tilted by being rotated about the first axis, the fixed member 431 is lowered down with respect to the base plate 20. However, due to the resiliency of the spring 433 and the abutting engagement of the edge 436 with the support panel 271 of the base plate 20, the indication member 434 is forced to move with respect to the fixed member 431 and thus moved upwardly with respect to the rotation center of the saw blade 11. With the rotation of the saw blade 11 about the first axis, the indicating end 437 is moved inside the cutout 281 in the transverse direction. In this respect, the cutout 281 is sufficiently large to accommodate the movement of the indicating end 437. Similar with the previous embodiments, the indicating end 437 is substantially located at an elongation line of the intersection between the saw blade 11 and the bottom surface 21 of the base plate 20. Therefore, the indicating end 437 can indicate the alignment of the guide line on the workpiece and the actual cutting route of the saw blade in advance no matter at what angle the saw blade is tilted transversely with respect to the base plate so as to ensure a proper cut all the time. During tilting of the saw blade 11, the elastic member 433 is further compressed and inducing a greater biasing force that biases the edge 436 more tightly against the support panel 271 to ensure the abutting engagement between the indication member 434 and the base plate 20.

Figure 9:
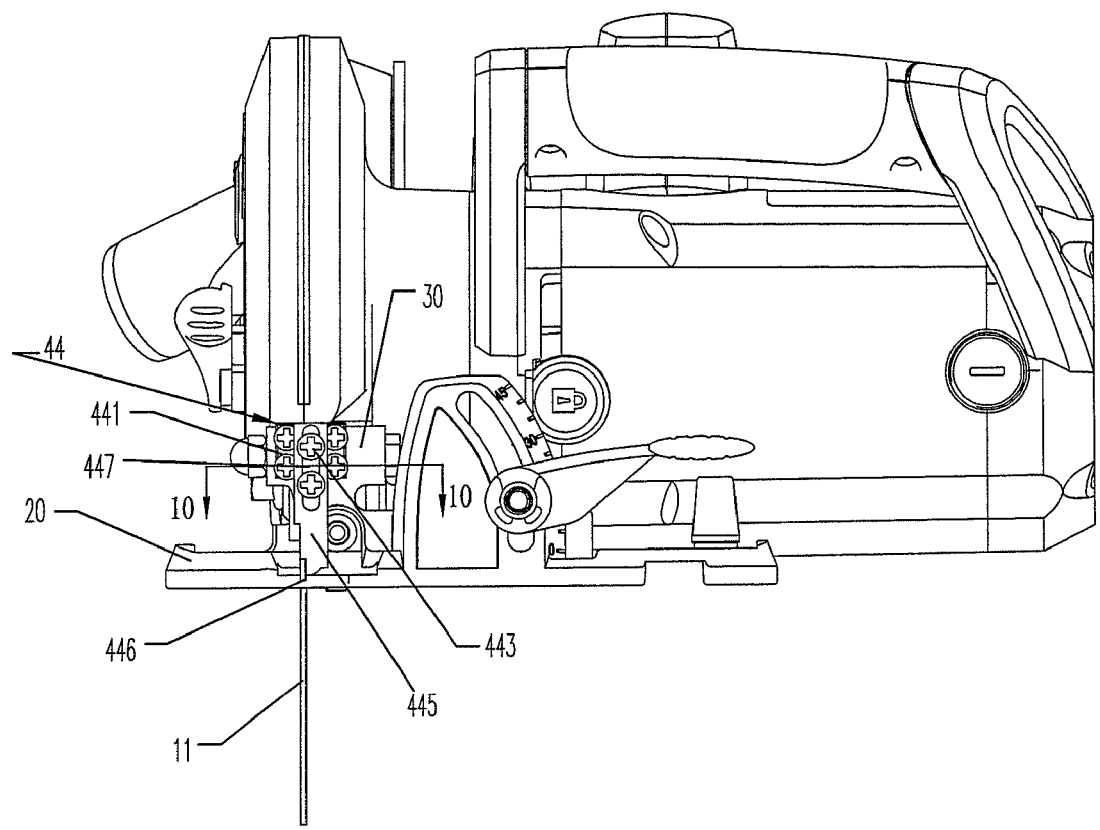
FIG. 9 is a side elevational view of a circular saw constructed in accordance with a fourth embodiment of the present invention.
Figure 10:
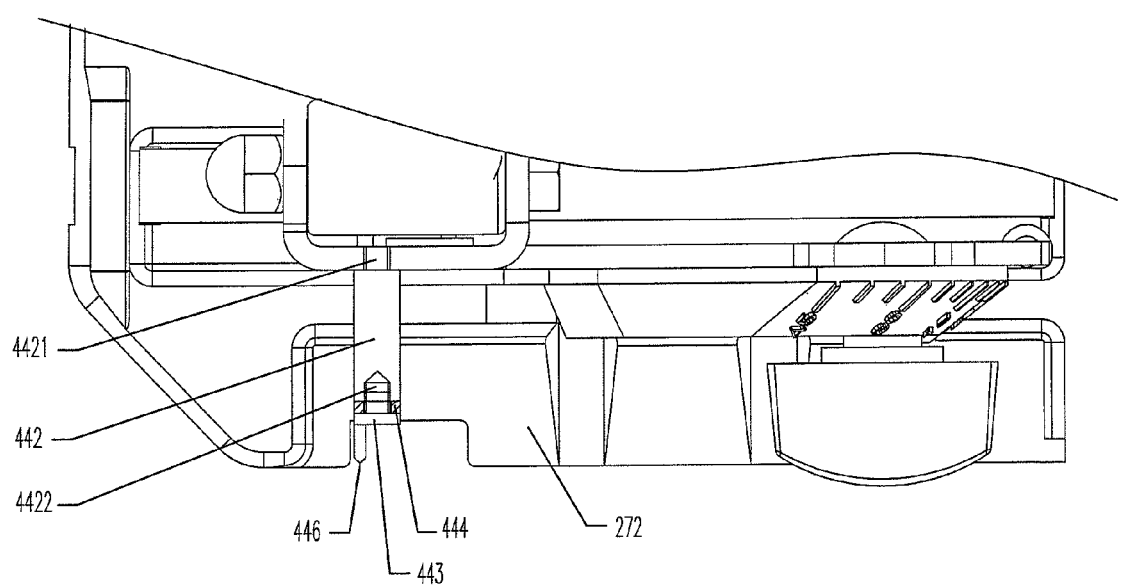
FIG. 10 is a cross-sectional view taken along line 10-10 of FIG. 9.

FIGS. 9 and 10 show a circular saw in accordance with a fourth embodiment of present invention. Compared to the third embodiment, the fourth embodiment adopts an alignment indication assembly 44, which is a modification of the alignment indication the assembly 43 of the third embodiment. In the fourth embodiment, the urging mechanism comprises a fixed panel 441 secured to the intermediate panel 30 through bolts or screws, a pair of pins 442 vertically extending from the fixed panel 441 and spaced from each other in the longitudinal direction, and two bolts 443 threadingly attached to the pins 442, respectively. Each pin 442 has a rear portion forming external threading 4421 threadingly engaging and thus fixing the pin 442 to the fixed panel 441, and a front portion defining a hole forming internal threading 4422. The bolts 443 are screwed into the internally-threaded holes of the pins 442 through threading engagement with the internal threading 4442. The indication member 444 has an elongated rod 445 and a tab extending from the rod 445 and having a bottom forming an indicating end 446. The tab is identical in structure to the counterpart tab described with reference to the third embodiment, and thus repeated description will be omitted here. The rod 445 defines a vertically extending slot 447 opened at opposite sides thereof. As FIG. 9 shows, the slot 447 loosely receives the two bolts 443 which are fixed to the corresponding pins 442. The main difference of the fourth embodiment from the third embodiment is that the urging mechanism does not utilize an elastic member or the likes, and instead, weight of gravity of the indication member 444 of the fourth embodiment is used to force the indication member 444 against the support panel 272 of the base plate 20 and an gravity-based abutting engagement is established between the indication member 444 and the support panel 272. When the saw blade is rotated for tilting, the indication member 444 undergoes the same movement as its counterpart of the third embodiment, and this arrangement ensures an indicating end 446 of the indication member 444 always in alignment with the saw blade 11.

Figure 14:
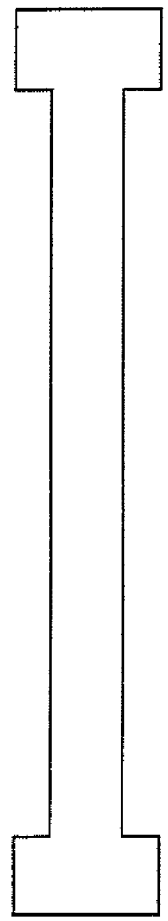
FIG. 14 is a cross-sectional view taken along line 14-14 of FIG. 13.

FIGS. 11-15 illustrate a circular saw in accordance with a fifth embodiment of present invention. Compared to the previous embodiments, the circular saw 1 of the fifth embodiment does not utilize an intermediate panel or the likes and, instead, the indication member is directly mounted to the housing 10. In the fifth embodiment, the alignment indication assembly also includes an urging mechanism and an indication member. The indication member 452 of the circular saw of the fifth embodiment has an upper portion 4521 with a pair of spaced rearward extending arms defining aligned holes, and a lower portion 4522 downwardly extending from a middle of the upper portion 4521 in an oblique manner. The lower portion 4522 has an I-shaped cross section, as best seen in FIG. 14, and comprises a bottom end 4523 for indicating alignment of the saw blade 11 with the guide line of the work piece and a swell 4524 formed thereon at a location above the bottom end 4523 for being supported by a support panel 273 of the base plate 20 to ensure a tiny gap or space between the bottom end 4523 and the bottom surface 21 of the base plate 20, see FIG. 13. The cover 12 of the housing 10 forms at a front end thereof an extension through which a transverse bore 17 is defined. The indication member 452 is coupled to the housing 10 by having the extension of the housing 10 received between the spaced arms of the upper portion 4521 thereof. A bolt 151 extends through the aligned holes of the arms of the upper portion 4521 of the indication member 452 and the transverse bore 17 of the cover 12 and mates a nut 152 to secure the indication member 452 to the cover 12. The bolt 151 defines the second axis A2 about which the saw blade 11 is rotatable to adjust the extent of the projection of the saw blade 11 below the base plate 20. In the fifth embodiment, the urging mechanism is a torsion spring 451 encompassing the bolt 451 and having opposite ends respectively engaging the cover 12 and the indication member 452.

Figure 15:
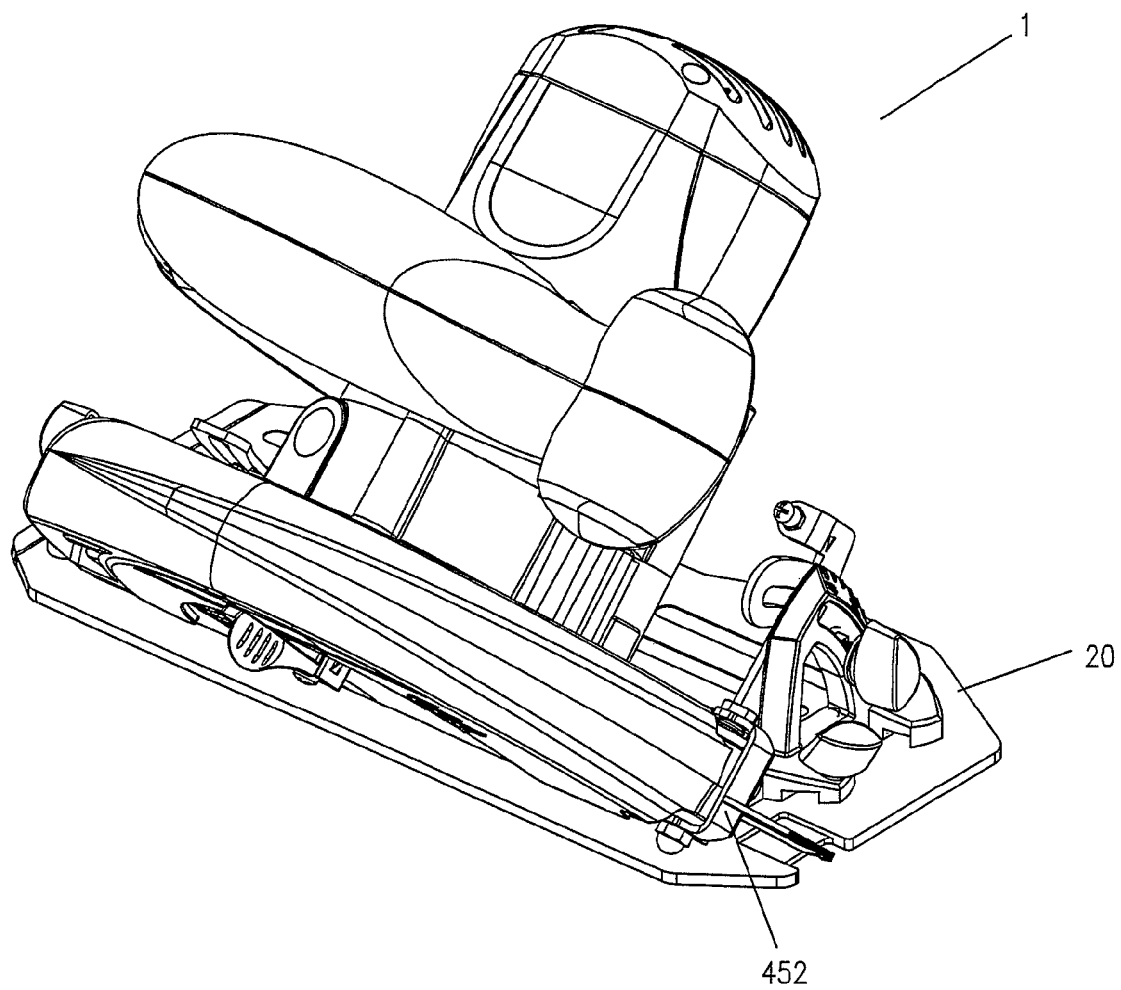
FIG. 15 is a perspective view of the circular saw of the fifth embodiment of the present invention, wherein the saw blade is tilted transversely with respect to the base plate.

With reference to FIG. 15, similar to the third embodiment, when the saw blade 11 rotates about the first axis A1 for tilting, the indication member 452 rotate in unison with the saw blade 11, and at the same time, the indication member 452 moves upward relative to the rotation center of the saw blade 11, thereby ensuring that the bottom end 4523 of the indication member 452 is in alignment with the saw blade 11 all the time. During the tilting of the saw blade 11 by rotating about the first axis, the torsion spring 451 is compressed to bias the indication member 452 against the base plate 20 more tightly. Alternatively, just like the example provided by the fourth embodiment, gravity-based abutting engagement can be used to replace the biasing force of the torsion spring.

Figure 12:
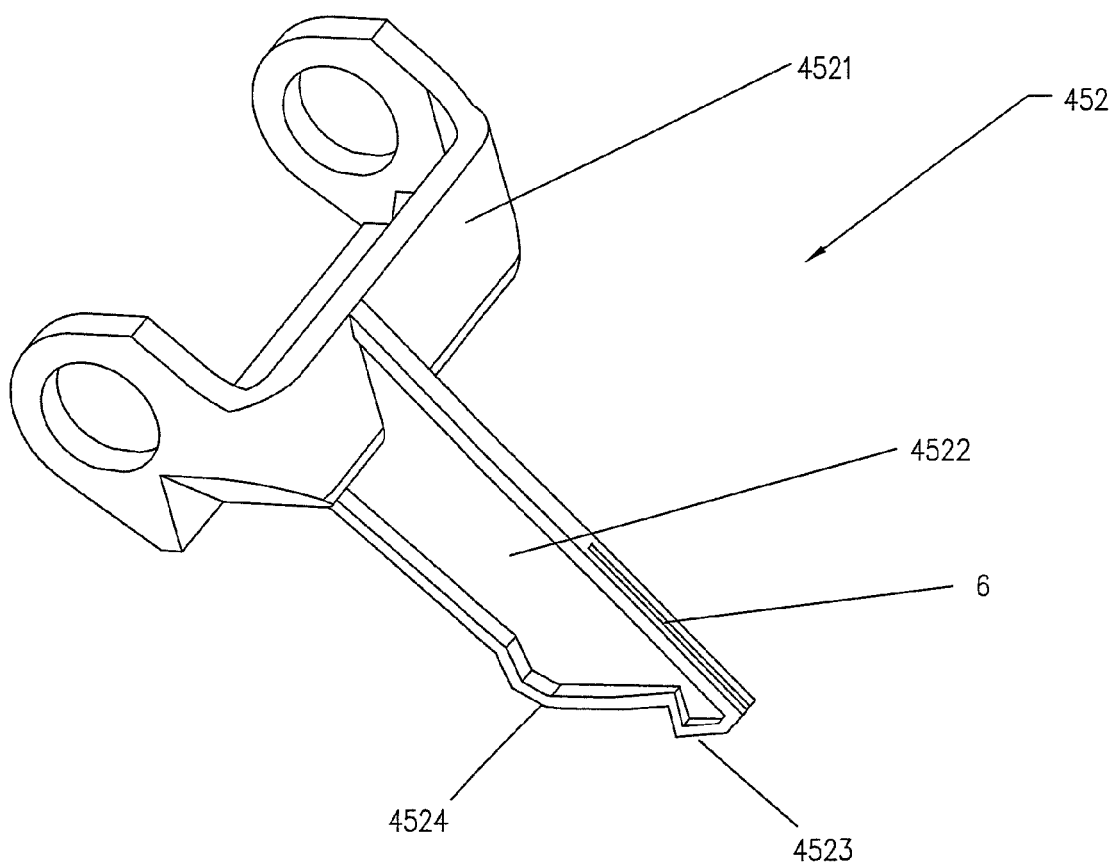
FIG. 12 is a perspective view of an indication member of the circular saw of the fifth embodiment of the present invention.
Figure 13:
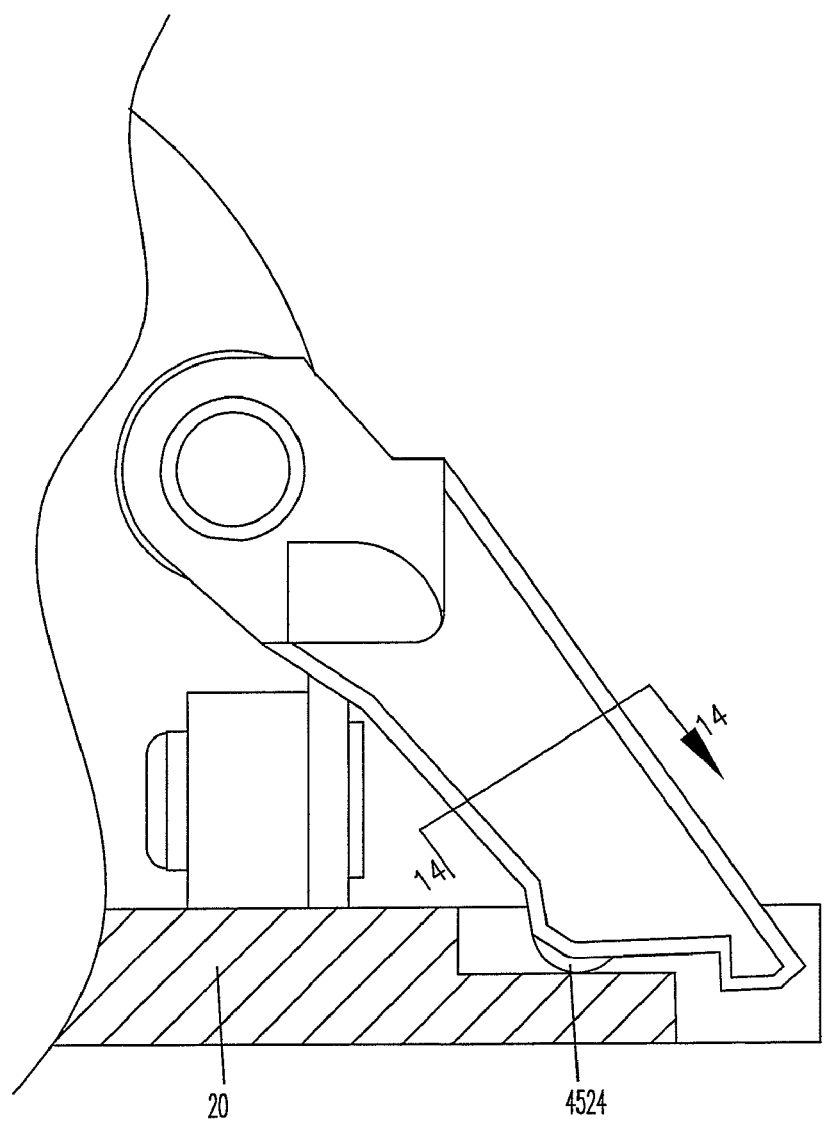
FIG. 13 is a partially cross-sectional view of the circular saw of the fifth embodiment of the present invention, showing the indication member having a swell abutting against the base plate with a bottom end thereof spaced by a tiny distance from a bottom surface of the base plate.

As shown in FIG. 12, it is noted that the indication member 452 of the fifth embodiment further comprises an indicia 6 disposed near the bottom end 4523 thereof. The indicia 6 can be an inked line formed adjacent to the bottom end as shown in the drawings. However, it is apparent that the indicia can be embodied in different ways, such as a colored stripe attached to the indication member. Furthermore, a laser emitter or a light-emitting diode can be alternative examples for mounting to the bottom end to provide an indicating end which ensures a visual indication even in a dark environment. It is obvious for those skilled in the art that the indicia can be incorporated in indication members of other embodiments in accordance with the present invention.

The alignment indication assembly selectively comprises a first alignment adjusting means for adjusting the indication member along the transverse direction of the base plate. Referring back to FIG. 11, the first alignment adjusting means comprises one or more washers 51 fit over the bolt 151. To adjust the bottom end 4523 of the indication member 452 for alignment with the saw blade 11 in an assembling process or just before a cutting operation is initiated, an operator may increase or decrease the number of the washers 51 fit on the bolt 151 on one side or both sides of the cover 12 to ensure precise alignment of the bottom end 4523 with the saw blade 11.

Figure 16:
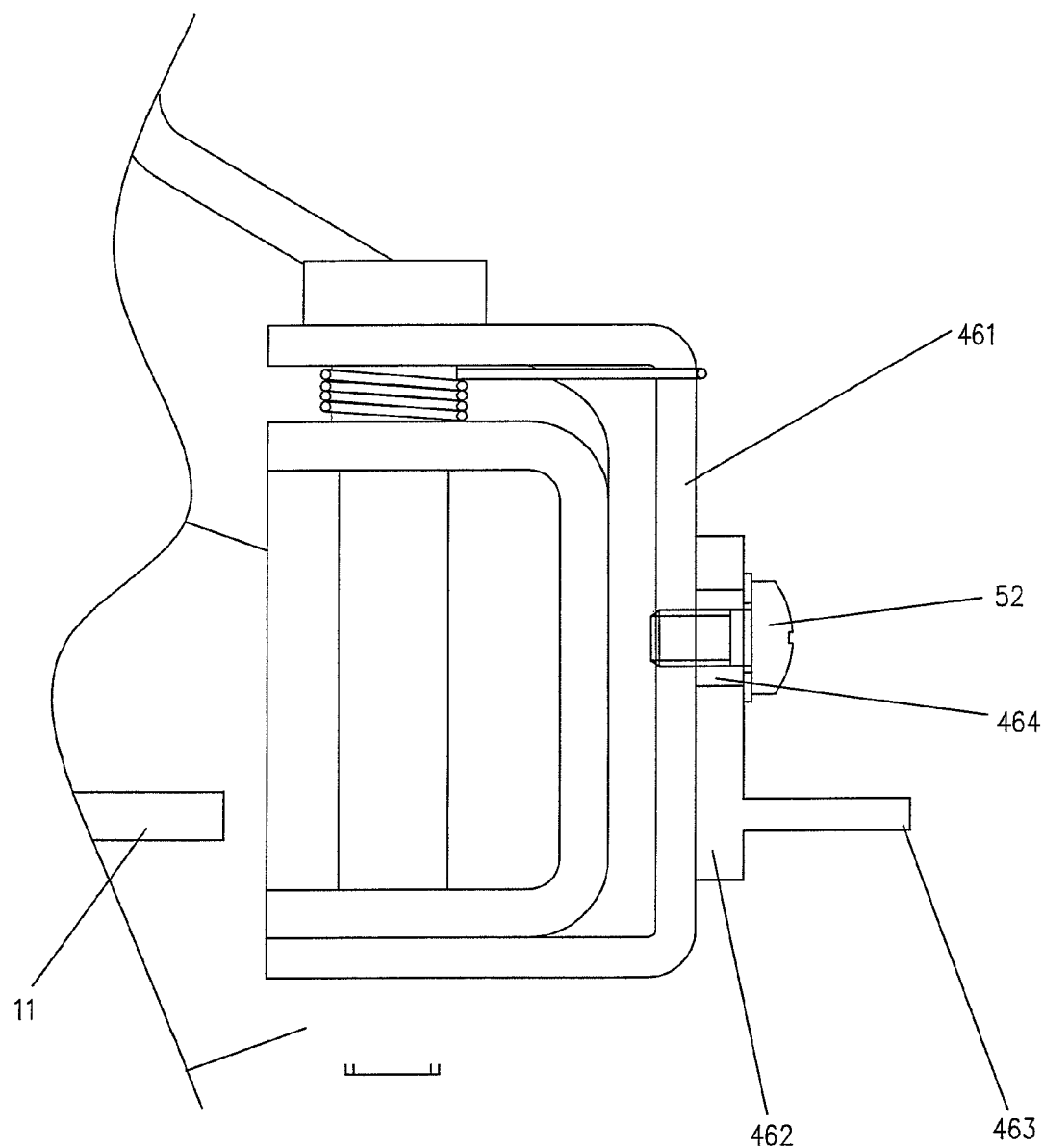
FIG. 16 is a partial plan view of a circular saw constructed in accordance with a sixth embodiment of the present invention, showing an alignment indication assembly comprising second alignment adjusting means.
Figure 17:
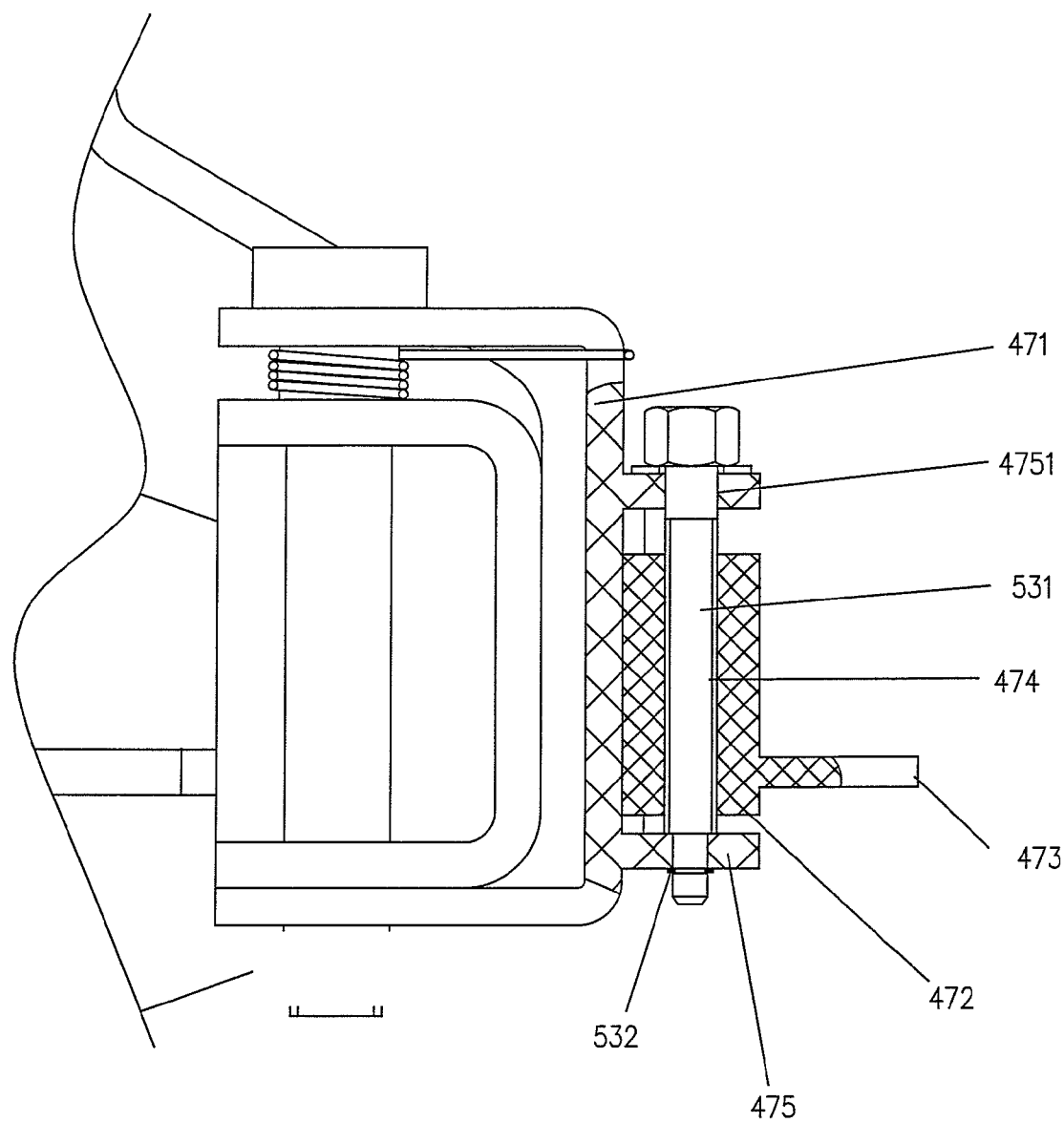
FIG. 17 is a partial plan view of a circular saw constructed in accordance with a seventh embodiment of the present invention, showing an alignment indication assembly comprising third alignment adjusting means.

FIGS. 16 and 17 respectively show a sixth embodiment and a seventh embodiment in accordance with present invention for illustrating second and third alignment adjusting means for the alignment indication assembly. In the sixth embodiment, the indication member has separate upper and lower portions 461, 462. The two separate portions 461, 462 are connected together by a bolt 52 in the longitudinal direction. The lower portion 462 defines a through hole 464 through which the bolt 52 extends. The hole 464 has a diameter larger than a nominal outside diameter of the bolt 52. With such an arrangement, the bottom end 463 of the lower portion 462 is movable and thus position-adjustable to align with the saw blade 11 prior to fastening the bolt 52.

In the seventh embodiment, the indication member 47 is also separated into an upper portion 471 and a lower portion 472. The upper portion 471 has a pair of spacers 475 extending from a front side thereof along the longitudinal direction and each defines an opening 4751 therein. The lower portion 472 defines a transversely extending passageway 474 with internal threading formed therein. In assembling, the lower portion 472 is located between the spacers 475 with the passageway 474 aligning the openings 4751 of the spacers 475. The distance between the spacers 475 is larger than the length of the passageway 474 so as to make the lower portion 472 movable with respect to the upper portion 471. A bolt 531 extends through the openings 4751 and the passageway 474. The bolt 531 has a head abuts against a circumference of the opening 4751 of the one spacer 475 and a threaded bolt body engaging the internal threading of the passageway 474. A clip 532 engages an end portion of the bolt 531 projecting outside the other spacer 475 and engaging the spacer 475 to fix the bolt 531 to the spacers 475 but allowing relative rotation therebetween. Thus, to adjust the indication member 47, the bolt 531 is rotated, and the threading engagement between the bolt 531 and the lower portions 472 induces a linear displacement of the power portion 472, and thus the bottom end 473, with respect to the spacers 475 and thus the upper portion 471. This allows the lower portion 472 to move in the transverse direction with respect to the upper portion 471 to achieve desired alignment.

Those skilled in the arts may readily conceive various ways for performing alignment adjustment by combination of two or more of the alignment adjusting means. Additionally, it is obvious for those skilled in the art that this kind of adjusting means can be used to the alignment indication assemblies that have been disclosed in other embodiments of present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A circular saw comprising:
   a housing;
   a motor mounted in the housing;
   a base plate mounted below the housing;
   a saw blade having a rotation center in driving coupling with the motor and having a portion projecting below the base plate, the saw blade being tiltable with respect to the base plate;
   an alignment indication assembly coupled to the housing and having an indication member with an indicating end;
   wherein the indication member is movable in relation to the rotation center of the saw blade in order to maintain the indicating end in line with the saw blade when the saw blade is being tilted;
   wherein the alignment indication assembly comprises an urging mechanism coupled to the housing and engaging the indication member to induce the movement of the indication member relative to the rotation center as the saw blade is being tilted; and
   wherein the urging mechanism comprises a fixed member immovable relative to the rotation center of the saw blade and defining a groove for receiving the indication member, and an elastic member arranged between the fixed member and the indication member for applying a biasing force to the indication member.

2. A circular saw comprising:
   a housing;
   a motor mounted in the housing;
   a base plate mounted below the housing;
   a saw blade having a rotation center in driving coupling with the motor and having a portion projecting below the base plate, the saw blade being tiltable with respect to the base plate around a first axis parallel to the base plate;
   an alignment indication assembly coupled to the housing and having an indication member with an indicating end;
   wherein the movable relation to a movement direction" has been replaced with indication member is movable in a movement direction which is perpendicular to the first axis and parallel to the base plate in order to maintain the indicating end in a same plane which is defined by the saw blade when the saw blade is being tilted with respect to the base plate.

3. The circular saw according to claim 2, wherein the indication member comprises a portion located above the indicating end that is supported by the base plate.

4. The circular saw according to claim 2, wherein the indication member comprises an indicia disposed adjacent to the indicating end.

5. The circular saw according to claim 2, wherein the alignment indication assembly comprises alignment adjusting means for adjusting the indication member in the movement direction.

6. The circular saw according to claim 2, wherein the alignment indication assembly comprises an urging mechanism coupled to the housing and engaging the indication member to induce the movement of the indication member relative to the rotation center as the saw blade is being tilted.

7. The circular saw according to claim 6, wherein the urging mechanism comprises a first lever immovable relative to the rotation center, a second lever rotatably connected to the first lever, and a third lever rotatably connected to the second lever and movably connected to the indication member, which are arranged in a way that the first and third levers have an identical angular velocity when the saw blade is being tilted with respect to the base plate.

8. The circular saw according to claim 7, wherein the base plate comprises at least one guiding member for guiding the indication member to move along the movement direction.

9. The circular saw according to claim 6, wherein the urging mechanism comprises a first gear immovable relative to the rotation center, a second gear meshing with the first gear, a third gear meshing with the second gear, and a rod secured to the third gear and movably connected to the indication member, and wherein the first and third gears have an identical number of teeth.

10. The circular saw according to claim 6, wherein the urging mechanism comprises a torsion spring having a plurality of arms for engaging the housing and the indication member respectively.

11. The circular saw according to claim 6, wherein the urging mechanism comprises a fixed panel immovable relative to the rotation center of the saw blade and a pin attached to the fixed panel and extending in a direction perpendicular to the movement direction, and wherein the indication member defines a slot for movably receiving the pin.

12. The circular saw according to claim 2 further comprising an intermediate panel connected to the base plate and to the housing.

13. The circular saw according to claim 2, wherein the indicating end of the indication member comprises a laser emitter.

14. The circular saw according to claim 2, wherein the movement of the indication member in the movement direction is relative to the base plate when the saw blade is being tilted with respect to the base plate.

15. A circular saw adapted for cutting a workpiece comprising:
   a housing;
   a motor mounted in the housing;

a base plate mounted below the housing and having a bottom surface adapted to contact the workpiece;

a saw blade in driving coupling with the motor, wherein the saw blade is tiltable with respect to the base plate around a first axis; and an alignment indication assembly attached to the housing and having an indication member with an indicating end wherein the indication member comprises a portion located above the indicating end, the indicating end being located in a same plane coincident with the saw blade and substantially in flush with the bottom surface of the base plate when the saw blade is being tilted, wherein the base plate has a support area for supporting the portion of the indication member to provide a gap between the bottom surface and the indicating end.

16. The circular saw according to claim 15, wherein the indicating end is at located at a bottom of the indication member.

17. The circular saw according to claim 15, wherein the gap between the bottom surface and the indicating end is not larger than 2 mm.

18. A circular saw comprising:

a base plate having a bottom defining a working surface;

a saw blade, which is supported on the base plate and defines a same plane in which the saw blade selectively undergoes rotation to perform a cutting operation, the saw blade being revolvable about a revolving axis, which is fixed with respect to the base plate, from a first angular position to a second angular position; and an alignment indication assembly comprising a mounting portion mounted in a way that allows for the alignment indication assembly to revolve with the saw blade when the saw blade revolves about the revolving axis and an indication member movable with respect to the mounting portion in a way that the indication member has an indicating end that moves in the same plane of the saw blade to get close to the working surface of the base plate when the saw blade revolves from the first angular position to the second angular position for positioning the indication end and the saw blade in the same plane which is coincident with the saw blade when the saw blade is being revolved, wherein the base plate has a support area for supporting a portion of the indication member to provide a gap between a bottom surface of the base plate and the indicating end.

19. The circular saw according to claim 18, wherein the alignment indication assembly comprises an urging mechanism that acts on the indication member to cause a motion of the indication member with respect to the mounting portion to move the indicating end close to the working surface when the saw blade revolves from the first angular position to the second angular position.

20. The circular saw according to claim 19, wherein the motion of the indication member caused by the urging mechanism comprises a linear displacement of the indication member with respect to the mounting portion.

21. The circular saw according to claim 20, wherein the mounting portion of the alignment indication assembly has a guiding section for guiding the indication member to perform the linear displacement when the urging mechanism acts on the indication member.

22. The circular saw according to claim 21, wherein the guiding section comprises a groove that extends in a direction substantially parallel to the same plane and having an opening facing the base plate, the indication member being slidably received in the groove.

23. The circular saw according to claim 22, wherein the urging mechanism comprises a biasing element arranged between the groove and the indication member to bias the indicating end toward the working surface.

24. The circular saw according to claim 21, wherein the guiding section comprises an elongate slot defined in the indication member and at least one guide bar that is fixed to the mounting portion and slidably received in the elongate slot.

25. The circular saw according to claim 24, wherein the urging mechanism utilizes a weight of the indication member to force the indicating end toward the working surface.

26. The circular saw according to claim 19, wherein the motion of the indication member caused by the urging mechanism comprises an angular displacement of the indication member with respect to the mounting portion.

27. The circular saw according to claim 26, wherein the mounting portion comprises a pivot fixed to the saw blade and wherein the indication member is rotatable about the pivot to perform the angular displacement.

28. The circular saw according to claim 27, wherein the urging mechanism comprises a biasing element arranged between the pivot and the indication member to bias the indicating end toward the working surface.

29. The circular saw according to claim 27, wherein the urging mechanism utilizes a weight of the indication member to induce a torque that drives the indicating end toward the working surface.

30. The circular saw according to claim 27, wherein the alignment indication assembly comprises a means for position adjustment of the indication member with respect to the pivot in a direction substantially parallel to an axis of the pivot.

* * * * *